United States Patent [19]

Sugawara et al.

[11] Patent Number: 5,671,105

[45] Date of Patent: Sep. 23, 1997

[54] MAGNETO-RESISTIVE EFFECT THIN-FILM MAGNETIC HEAD

[75] Inventors: Nobuhiro Sugawara, Kanagawa; Hideo Suyama; Akio Takada, both of Miyagi, all of Japan

[73] Assignee: Sony Corporation, Tokyo, Japan

[21] Appl. No.: 563,450

[22] Filed: Nov. 28, 1995

[30] Foreign Application Priority Data

Nov. 28, 1994 [JP] Japan .................................. 6-293469

[51] Int. Cl.$^6$ .......................................................... G11B 5/39
[52] U.S. Cl. ............................................. 360/113; 360/126
[58] Field of Search ..................................... 360/113, 126

[56] References Cited

U.S. PATENT DOCUMENTS

| | | | |
|---|---|---|---|
| 5,032,945 | 7/1991 | Argyle et al. | 360/126 |
| 5,325,253 | 6/1994 | Chen et al. | 360/113 |
| 5,434,826 | 7/1995 | Ravipati et al. | 360/113 X |
| 5,442,507 | 8/1995 | Koga et al. | 360/113 |
| 5,461,526 | 10/1995 | Hamakawa et al. | 360/113 |
| 5,495,378 | 2/1996 | Bonyhard et al. | 360/113 |
| 5,532,892 | 7/1996 | Nix et al. | 360/113 |

FOREIGN PATENT DOCUMENTS 0 521 563 A2  1/1993  European Pat. Off. .
7-86 032 A   3/1995  Japan .

Primary Examiner—John H. Wolff
Attorney, Agent, or Firm—Hill, Steadman & Simpson

[57] ABSTRACT

A magneto-resistive effect thin-film magnetic head including a magnetic layer exhibiting a magneto-resistive effect, the magnetic layer having a longitudinal axis and two ends positioned at opposite ends of the longitudinal axis, and a flux guide layer of a high magnetic permeability soft magnetic material formed at an overlapping one end of the magnetic layer, the flux guide layer having two opposite ends longitudinally aligned with the longitudinal axis of the magnetic layer. On overlapping both ends of the flux guide layer, there are formed separate hard fills operating as permanent magnets.

8 Claims, 5 Drawing Sheets

MAGNETO-RESISTIVE EFFECT THIN-FILM MAGNETIC HEAD

BACKGROUND OF THE INVENTION

This invention relates to a magneto-resistive effect thin-film magnetic head which has a magnetic layer exhibiting a magneto-resistive effect of being changed in resistivity by a recording magnetic field from a magnetic recording medium and which is configured for detecting changes in resistance as a playback output voltage.

In keeping up with development of small-sized large-capacity hard disc devices, there is an increasing demand for a small-sized hard disc device with a diameter of the order of e.g., 2.5 inches, as a possible application of the hard disc device to a portable computer exemplified in particular by a notebook-type personal computer.

With the small-sized hard disc, since the velocity of the recording medium is decreased depending on the disc diameter, the playback output is decreased with the conventional induction magnetic head whose playback output depends upon the velocity of the recording medium, thus frustrating further attempts in increasing the recording capacity.

On the other hand, a magneto-resistive effect thin-film magnetic head (MR head), in which changes in resistance of a magnetic layer having the magneto-resistive effect of being changed in resistivity by the magnetic field are designed to be detected as a playback output voltage (MR element), has such a feature that its playback output is not dependent upon the velocity of the recording medium and a high playback output can be obtained even with the low velocity of the recording medium. Thus the MR head is attracting attention as a magnetic head capable of realizing a large recording capacity with the small-sized hard disc.

The MR thin-film head is such a playback magnetic head which exploits the so-called magneto-resistive effect in which the value of the electrical resistance is changed by the angle between the direction of magnetization in a transition metal and the direction of the current flowing therein. That is, if the stray magnetic flux from a magnetic recording medium is received by the MR element, the direction of magnetization of the MR element is inverted by the magnetic flux and comes to include an angle corresponding to the magnetic quantity with the direction of the current flowing in the MR element. Thus the value of the electrical resistance of the MR element is changed and a change in voltage corresponding to the change in the electrical resistance value appears across both ends of the MR element in which flows the sense current. Thus the changes in the electrical voltage may be read out as a voltage signal for reading out the magnetic recording signal. A bias magnetic field is applied at this time so that the operating point of the MR element will correspond to a point of superior linearity of the resistance changes relative to the external magnetic field and of the maximum resistance change of the MR element, that is an optimum bias point.

The MR thin-film head is formed by forming the MR element, electrode film or the insulating film on a pre-set substrate by a thin film forming technique and by etching the thin films by a photolithographic technique to a pre-set shape. The MR thin-film head has a shield structure in which upper and lower magnetic poles are arranged as shield materials for specifying the gap length for reproduction and for prohibiting unneeded magnetic flux from being intruded into the MR element.

Specifically, with the so-called vertical MR thin-film head, in which the sense current flowing in a direction normal to the direction of track width, an insulating layer, a soft magnetic layer and an insulating layer formed of $Al_2O_3$ or $SiO_2$ are sequentially layered on a non-magnetic substrate, and the MR element is arrayed on the insulating layer so that its longitudinal direction is perpendicular to its surface facing the magnetic recording medium (surface of the head on which slides the magnetic recording medium) and so that its one end face will be exposed on the surface of the head on which slides the magnetic recording medium. Both end faces of the MR element are provided with forward and rear electrodes for supplying the sense current to the MR element, on which an insulating layer formed of $Al_2O_3$ or $SiO_2$ is formed. This insulating layer is sandwiched between the forward and rear electrodes. On the insulating layer is arranged a bias conductor for facing the MR element and for impressing a bias magnetic field to the MR element. On the bias conductor is arranged an insulating layer, on which is layered a soft magnetic layer operating as the upper magnetic pole for constituting the MR thin-film head.

Since the MR thin-film head is constructed so that the MR element is sandwiched between the upper and lower magnetic poles the S/N ratio of the playback output and the recording density may be improved as compared to the head devoid of the upper and lower magnetic poles.

The above-described vertical MR thin-film head has such a feature that the forward electrode can be grounded for allowing the sense current to flow in the MR sensor in a direction perpendicular to the surface of the head on which slides the magnetic recording medium, so that it is structurally superior in resistance against electrostatic destruction. However, the portion of the MR head lying directly below the forward electrode represents a so-called magnetically non-sensitive portion which is not sensitive to the signal magnetic field from the magnetic recording medium. With the MR thin-film head, since the signal magnetic field from the magnetic recording medium becomes larger towards the distal end of the MR sensor, safety against electrostatic destruction is safeguarded at the cost of reduction of approximately 20% of the playback output.

For compensating the lowering of the playback output, it has been proposed to provide a flux guide layer formed of a high magnetic permeability soft magnetic material. Referring to FIG. 1, the flux guide layers are formed as two layers on the rear end of an MR element 101. That is, an intermediate layer 103 for Ni-Fe plating and a plating layer 104 formed by Ni-Fe plating are sequentially formed on an underlying layer 102 formed of a high magnetic permeability soft magnetic material, such as Ta. The intermediate layer 103 needs to be provided since the plating layer 104 cannot be directly formed on the underlying layer 102. The intermediate layer 103 may be used for managing magnetic anisotropy such that the plating layer 104 will be grown in accordance with the magnetic anisotropy. The underlying layer 102 operates for assisting in affording magnetic anisotropy to the intermediate layer 103.

For assuring magnetic stability for the MR element by exploiting shape anisotropy of the flux guide layer, it is necessary for the flux guide layer to be of a transversely elongated shape with respect to the sliding direction of the magnetic recording medium, that is of such a shape which is free from corners and in which Li>W1, where L1 and W1 denote the transverse width and the vertical width of the flux guide layer, respectively, as shown in FIG. 2. However, the flux guide layer forms a cyclic magnetic domain, as indicated by arrow M, so as not to generate magnetic poles by itself. If a magnetic wall 105, produced by the cyclic magnetic domain, is rapidly moved by the magnetic field generated by the sense current, bias magnetic field or the disturbing magnetic field, the magnetized state of the MR element 101 is rapidly changed, thus producing so-called Barkhausen noise and inducing an unstable magnetic head operation. There is also a risk that the magnetic reluctance of the flux guide layer and the bias magnetic field applied to the MR element 101 be changed to depart from the optimum bias point thereby lowering the magnetic head output. In addition, it is extremely difficult to assure a constant magnetized state of the flux guide layer of each thin-film magnetic head, due to manufacture constraints of the MR thin-film magnetic head, thus producing fluctuations in the intensity of the bias magnetic field from one product to another.

Thus, with the MR thin-film head, it is extremely difficult at present to suppress the Barkhausen noise and to maintain high magnetic head output, and thus a method is searched for possibly avoiding these inconveniences.

OBJECT AND SUMMARY OF THE INVENTION

It is therefore an object of the present invention to provide a MR thin-film magnetic head whereby it becomes possible to substantially eliminate generation of the Barkhausen noise, develop an extremely high output, suppress fluctuations in various head characteristics from product to product in the course of manufacture and to improve the yield and operational reliability significantly.

The present invention is directed to a magneto-resistive effect thin-film magnetic head (MR thin-film head) having a magnetic layer which is formed by a thin-film forming technique (MR element) and which is changed in resistivity by the magnetic field. The MR thin-film magnetic head detects changes in resistance as a playback output voltage. The present invention is mainly concerned with a so-called vertical MR thin-film head in which the magnetic layer having the magneto-resistive effect is provided in a direction perpendicular to the sliding direction of the magnetic recording medium and the forward and rear electrodes are formed at the upper and lower portions in the longitudinal direction of the magnetic layer, with the sense current being supplied to the magnetic layer in a direction perpendicular to the track width direction.

The magneto-resistive effect thin-film magnetic head includes a magnetic layer exhibiting a magneto-resistive effect, and a flux guide layer of a high magnetic permeability soft magnetic material, formed at one end of the magnetic layer, wherein, according to the present invention, hard films operating as permanent magnets are formed on both ends of the flux guide layer.

The flux guide layer is formed of a Ni-Fe based alloy or a Co-Zr based amorphous alloy. The hard films are formed of a material selected from the group consisting of Co-Pt based alloys, Co-Cr based alloys, Sm-Co based alloys, Nd-Fe based alloys and ferrite.

The flux guide layer is formed via an underlying layer formed e.g., of Ta or Cr in view of adhesion of the flux guide layer.

With the MR thin-film head of the present invention, hard films, operating as permanent magnets, are formed on both ends of the flux guide layer which is formed of a high magnetic permeability soft magnetic material and which is formed at an end portion of the MR element. If the hard films are magnetized to pre-set polarities for impressing the generated magnetic field in the sliding direction of the magnetic recording medium, there is produced no cyclic magnetic domain in the flux guide layer, but a sole magnetic domain is formed, with the magnetic field emanating from one of the hard layers and reaching the opposite hard layer. Thus there is hardly produced a magnetic wall in the flux guide layer thus suppressing the generation of the Barkhausen noise due to magnetic wall movement and concomitant unstable magnetic head movement or lowering in the magnetic head output.

Since the Barkhausen noise is hardly produced, the MR head has an extremely high output, such that it becomes possible to suppress fluctuations in head performance from product to product for improving the product yield and operating reliability.

DESCRIPTION OF THE PREFERRED EMBODIMENTS

Figure 1:
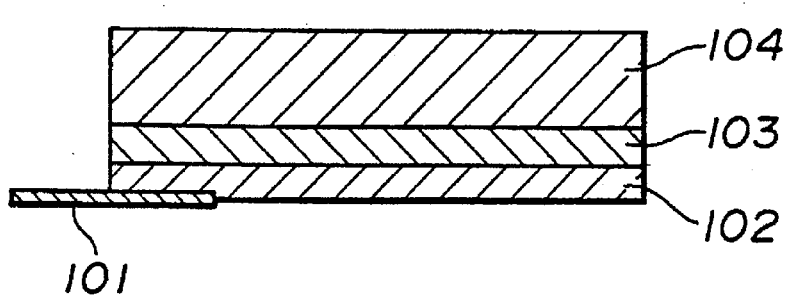
FIG. 1 is a schematic cross-sectional view showing the construction of the vicinity of the flux guide layer in a conventional MR thin-film magnetic head.
Figure 2:
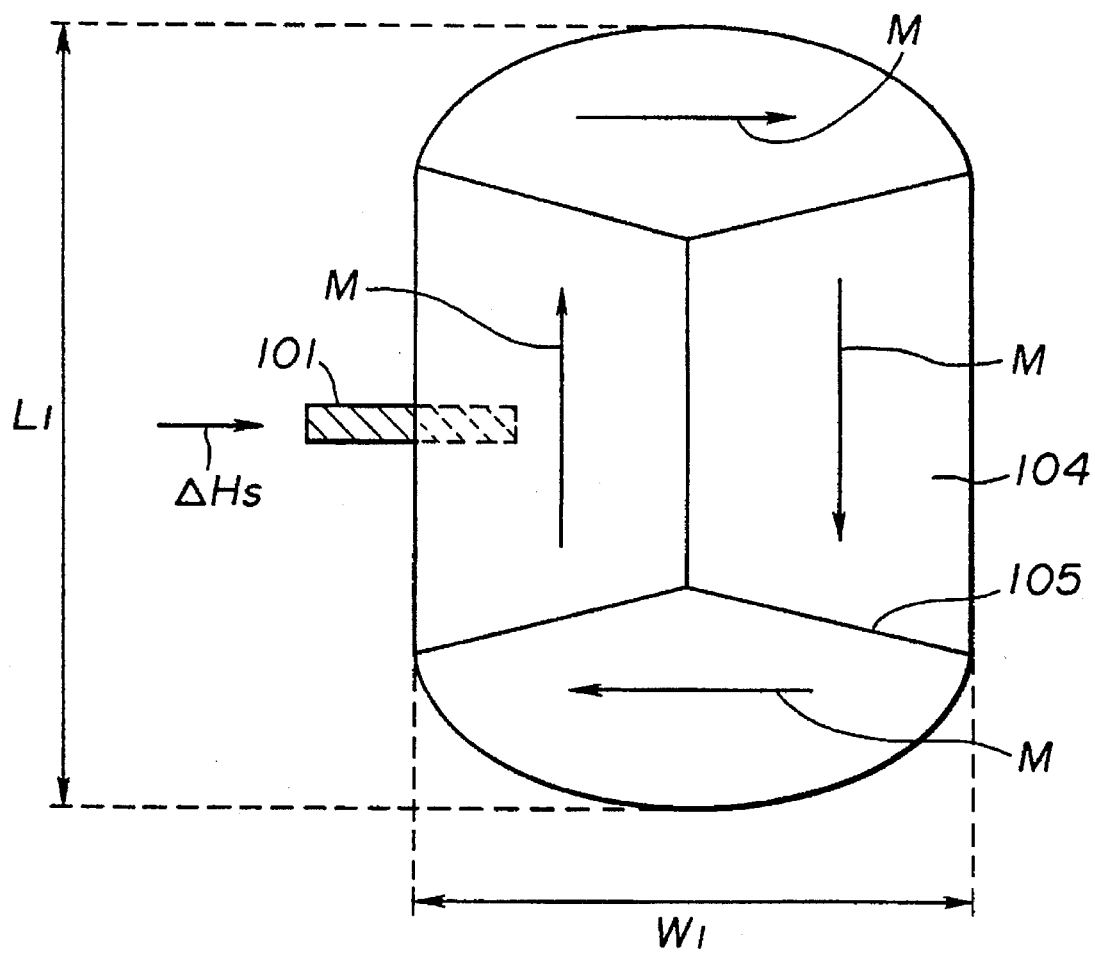
FIG. 2 is a schematic plan view showing the construction of the vicinity of each hard film and the flux guide layer.

Referring to the drawings, preferred embodiments of the magneto-resistive effect thin-film magnetic head (MR thin-film magnetic head) according to the present invention will be explained in detail.

Figure 3:
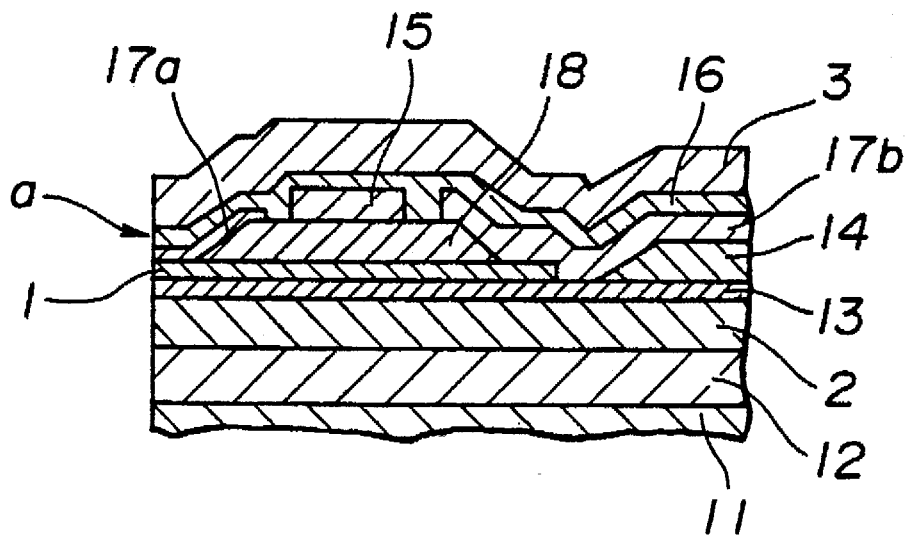
FIG. 3 is a schematic cross-sectional view showing a MR thin-film magnetic head according to a preferred embodiment of the present invention, with the upper magnetic pole being removed.

The MR thin-film head of the present embodiment is of such a construction in which a magnetic layer 1 with magneto-resistive effect (MR element 1) having its longitudinal direction extending perpendicular to a surface of the head along which slides a magnetic recording medium a is sandwiched between a lower magnetic pole 2 and an upper magnetic pole 3, as shown in FIG. 3. That is, the MR thin-film magnetic head is constructed as a so-called vertical thin-film magnetic head.

Specifically, on a non-magnetic substrate 11 of $Al_2O_3$-TiC is formed, via an insulating layer 12, the lower magnetic pole 2 formed of Ni-Fe, as a shield magnetic film. On the surface of the lower magnetic pole 2 is deposited an insulating layer 13 formed of $Al_2O_3$.

On the upper insulating layer 13 is formed the MR element 1. An insulating layer 14 of $SiO_2$ is formed at a pre-set portion in the vicinity of the MR element 1, on which is formed, via an insulating layer 18, a bias conductor 15, as a component part of the MR element 1, for impressing a bias magnetic field to the MR element 1. On the bias conductor 15 is formed an insulating layer 16 of $SiO_2$, on which the upper magnetic pole 3 is formed by a magnetic film of e.g., Ni-Fe for constituting the MR thin-film head.

The depositing position and the pattern of the bias conductor 15 may be of a variety of configurations, such as a two-layer or spiral configuration. A permanent magnet film may also be employed in stead of exploiting a magnetic field induced by current.

The insulating layers 13 and 14 may also be formed of beryllium oxide or aluminum nitride, in stead of $Al_2O_3$ or $SiO_2$.

With the above-described MR thin-film head, the MR element is arrayed so that its longitudinal direction is perpendicular to the surface of the head facing the magnetic recording medium, that is the surface of the head along which slides the magnetic recording medium a, and so that its one end face is exposed on the surface of the head along which slides the magnetic recording medium a. At the end portion of the MR element 1, towards the surface of the head along which slides the magnetic recording medium a, and a portion spaced a pre-set distance therefrom, there are respectively formed a forward end electrode 17a, which is an electrode formed by an electrically conductive film, and a flux guide layer 17b, which is similarly an electrode formed by an electrically conductive film, and which also operates as a rear end electrode. The forward end electrode 17a and the flux guide layer 17b are formed for flowing the sense current along the length of the MR element 1, that is in a direction perpendicular to the surface of the head along which slides the magnetic recording medium a. That is, the MR element 1 and the insulating layer 18 are sandwiched between the forward end electrode 17a and the flux guide layer 17b. With the above-described MR thin-film magnetic head, a region of the MR element 1 defined between the forward end electrode 17a and the flux guide layer 17b of the MR element 1 exhibits the magneto-resistive effects.

Figure 4:
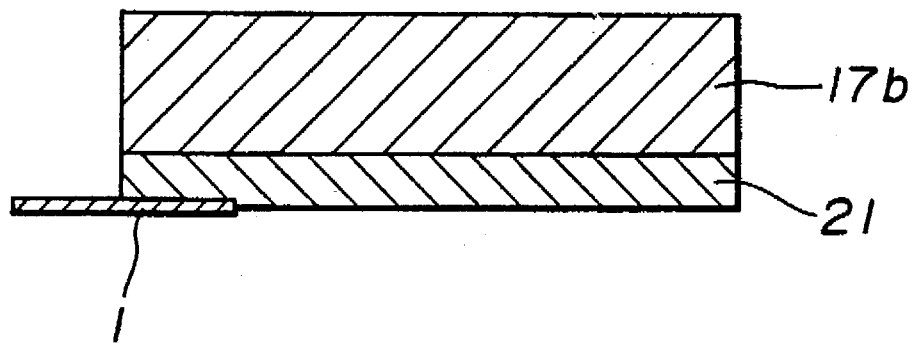
FIG. 4 is a cross-sectional view showing the construction in the vicinity of the flux guide layer.

The flux guide layer 17 is formed by sputtering on an underlying layer 21 of Cr and Ta using a Co-Zr based amorphous alloy as a material for sputtering, as shown in FIG. 4. The material for the flux guide 17b may e.g., be Ni-Fe, it being sufficient if it is a soft magnetic material having the initial magnetic permeability μ of not less than 2000 in the plain coated state. However, since the flux guide layer of Ni-Fe cannot be directly applied by plating on the underlying layer 21, an intermediate layer needs to be provided between the underlaying layer 21 and the flux guide layer.

Figure 5:
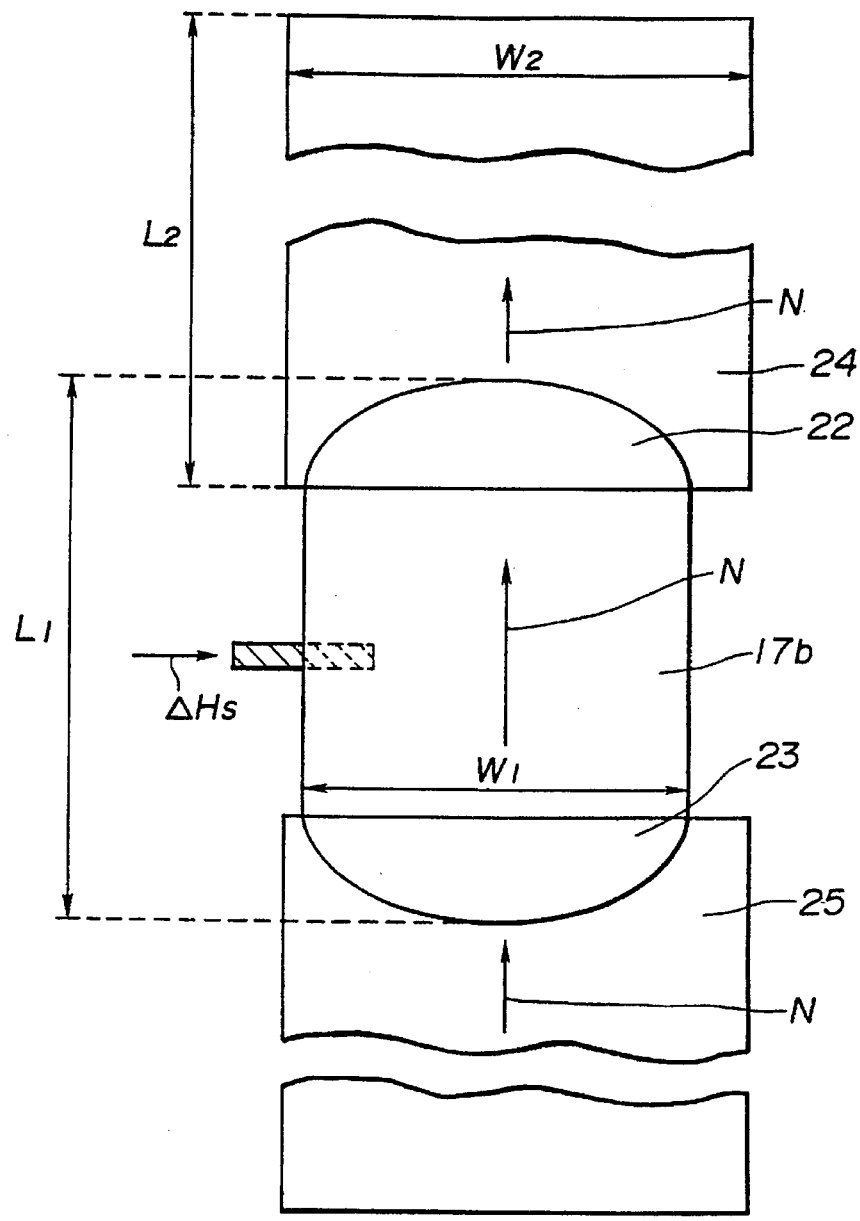
FIG. 5 is a schematic plan view showing the construction of the vicinity of each hard layer and the flux guide layer.
Figure 6:
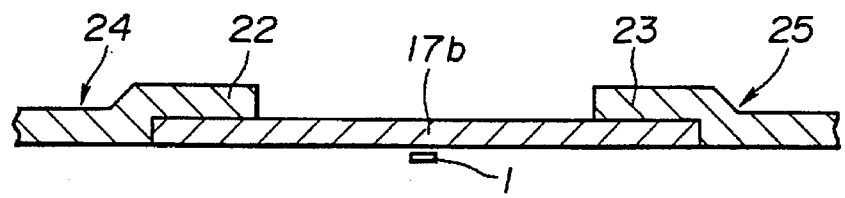
FIG. 6 is a schematic cross-sectional view showing the construction of the vicinity of each hard layer and the flux guide layer.

In the present embodiment, hard films 24, 25, functioning as permanent magnets, are formed on ends 22, 23 of the flux guide layer 17b, as shown in FIGS. 5 and 6. The hard films 24, 25 are formed of permanent magnet materials, such as Co-Pt based alloys, Co-Cr based alloys, Sm-Co based alloys, Nd-Fe based alloys or ferrite, and are formed in a transversely elongated plan configuration along the sliding direction of the magnetic recording medium. The transverse width L1 and the vertical width W2 of the flux guide layer 17b, where L2>W2, are selected to be larger than the transverse width L1 and the vertical width W1 of the flux guide layer 17b, where L1>W1.

Figure 7:
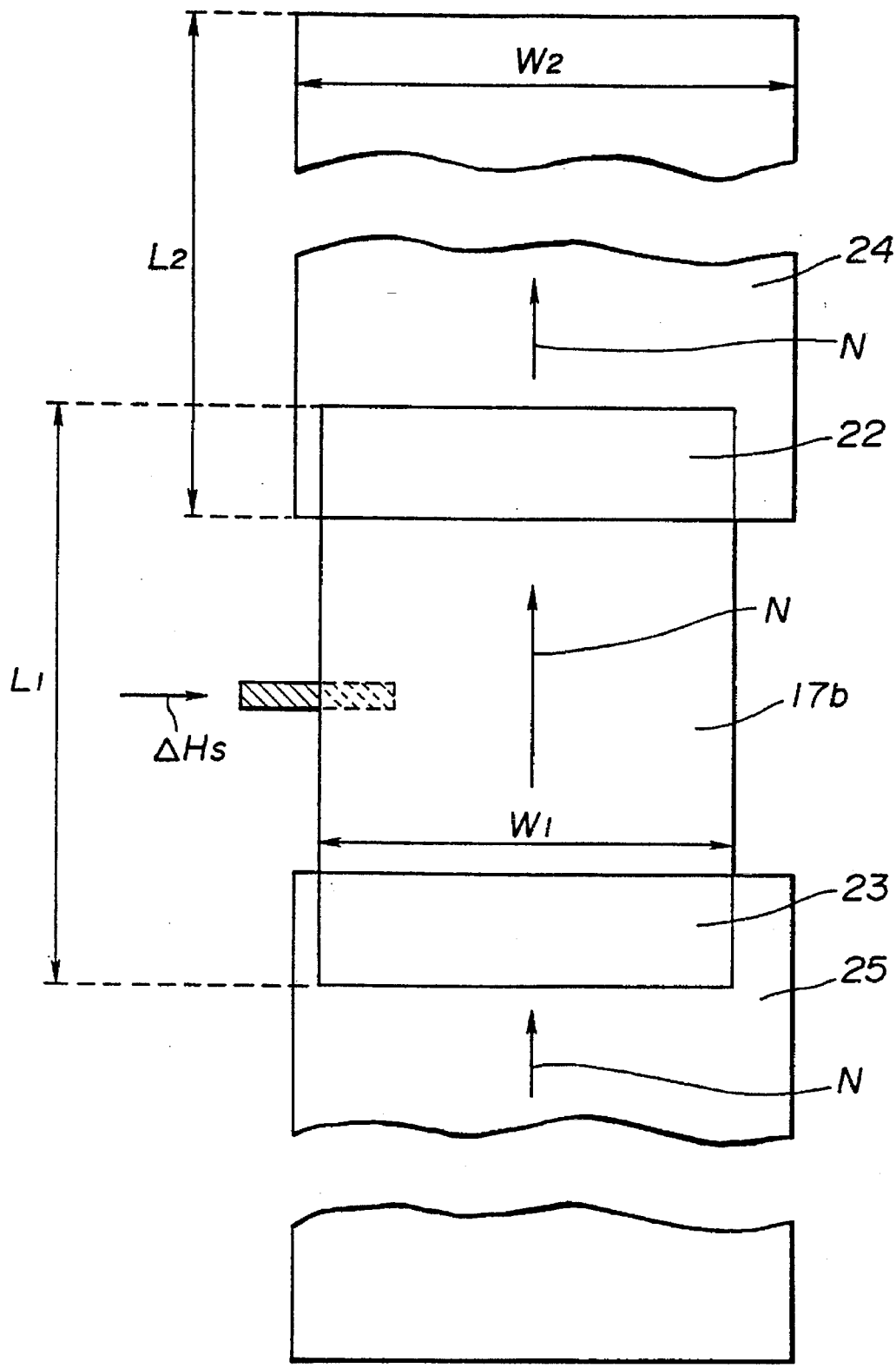
FIG. 7 is a schematic plan view showing another example of the construction of the vicinity of each hard layer and the flux guide layer.

It is unnecessary for the flux guide layer 17b to be free of corners as conventionally, as shown in FIG. 5. That is, the flux guide layer 17b may be rectangular in shape, as shown in FIG. 7. The total film thickness of the flux guide layer 17b and the hard film 24 or 25 may be on the order of 100 to 400 nm.

Figure 8:
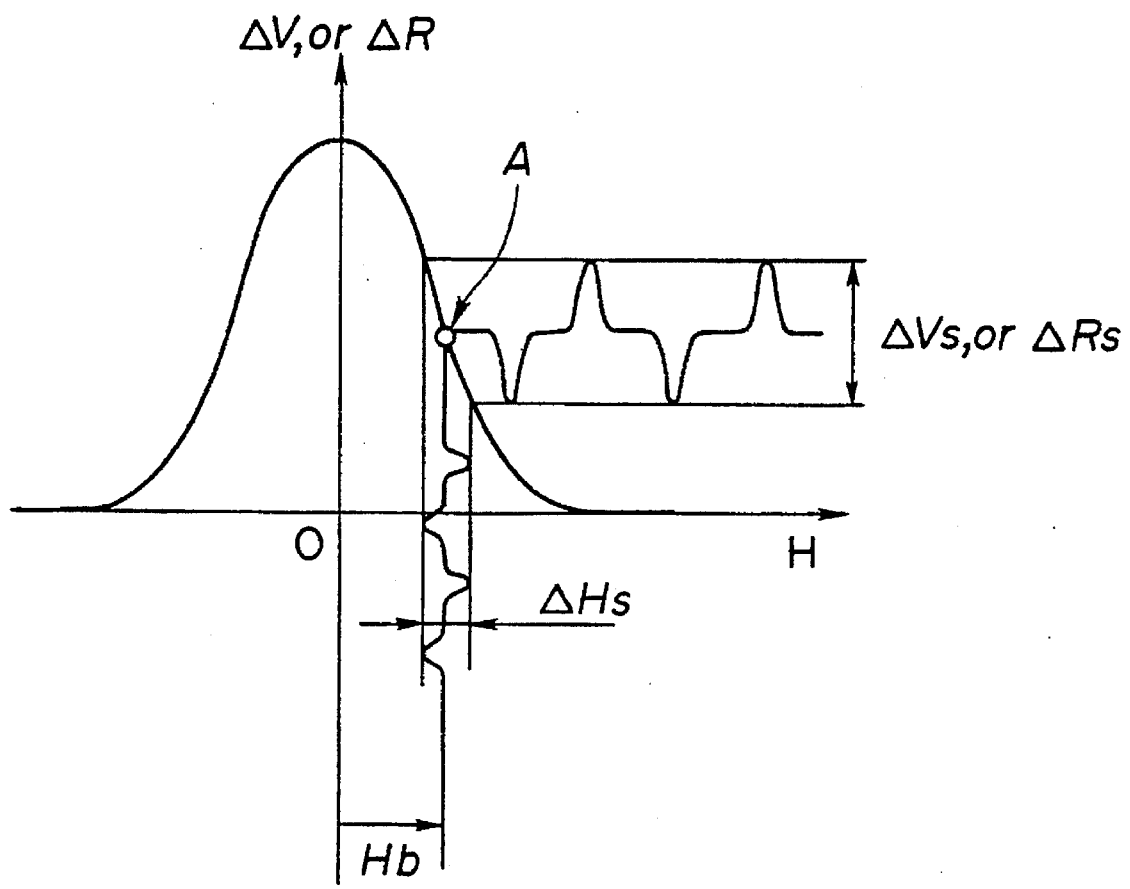
FIG. 8 is a graph showing characteristics of magneto-resistive effect.

If, with the above-described MR thin-film magnetic head, the MR element receives the stray magnetic flux from the magnetic recording medium, the direction of magnetization of the MR element 1 is inverted by the magnetic flux and comes to have an angle corresponding to the intensity of the magnetic field relative to the direction of the current flowing in the inside of the MR element 1. Thus the magnetic recording signal may be read in terms of the change in voltage as a voltage signal. A bias magnetic field Hb is impressed at this time so that an operating point A of the MR element corresponds to a point of superior linearity of changes in resistance relative to the external magnetic field H and of maximum amount of change of the resistance R of the MR element, that is the optimum bias point, as shown in FIG. 8. If the sense current is supplied in this manner to the MR element 1, the input magnetic signal field ΔHs may be taken out as a voltage output $\Delta V_S$ with changes in resistance $\Delta R_S$.

Thus, with the MR thin-film head, the hard films 24, 25, operating as permanent magnets, are formed on one end of the MR element 1, herein on both ends 22, 23 of the flux guide layer 17b of a high magnetic permeability soft magnetic material formed simultaneously as the rear end electrode. That is, if the hard films 24, 25 are magnetized and the magnetic field thus generated is applied in the sliding direction of the magnetic recording medium, there is produced no cyclic magnetic domain on the flux guide layer 17b, but a unidirectional magnetic field emanating from the hard film 24 and reaching the hard film 25 is generated, such that the flux guide layer 17b presents a sole magnetic domain. Thus there is scarcely produced a magnetic wall on the flux guide layer 17b, so that generation of the Barkhausen noise due to movement of the magnetic wall is suppressed for thereby suppressing the resulting unstable magnetic head movement or the lowering in the magnetic head output.

For fabricating the MR thin-film head, a pre-set resist pattern is formed via the insulating layer 12 on the non-magnetic substrate 11 formed of $Al_2O_3$. The lower magnetic pole is then formed by e.g., ion beam etching as a magnetic film of Ni-Fe.

On the lower magnetic pole 2 is layered an insulating layer 13 on which the MR element 1 is formed. That is, Ni-Fe is sequentially layered on the insulating layer 13 by a thin film forming technique, such as sputtering or vacuum deposition. The MR element 1 thus formed is patterned to the shape of the MR element 1, using a photoresist, and etched to a required shape.

The insulating layer 14 then is formed at a pre-set position in the vicinity of the MR element 1, and an electrode hole, not shown, serving for forming the flux guide layer 17b, which is used simultaneously as the forward end electrode 17a and the rear end electrode, is formed. That is, a resist is first coated for forming a resist layer which is then formed to a pre-set shape using a mask. The insulating layer 14 is etched by reactive ion etching (RIE) for forming the electrode hole to a pre-set pattern and subsequently the resist layer is removed.

On the MR element 1, the bias conductor 15, with the interposition of the insulating layer 18, the forward end electrode 17a and the flux guide layer 17b, formed of W, Ti and Mo, are formed by sputtering followed by RIE. The hard films 24, 25 are magnetized in the direction indicated by arrow N in FIGS. 5 or 7, that is in the sliding direction of the magnetic recording medium, for magnetizing the flux guide layer 17b with a sole magnetic domain as indicated by arrow N.

After subsequently forming the flux guide layer 17b, the hard films 24, 25, operating as permanent magnets, are formed on both ends 22, 23 thereof. That is, a resist layer is formed by coating a resist and trimmed to a pre-set shape using a mask. Subsequently, the hard films 24, 25 are formed by sputtering followed by RIE, as in the case of forming the forward end electrode 17a and the flux guide layer 17b.

On the forward end electrode 17a, flux guide layer 17b and the hard films 24, 25 is formed the insulating layer 16 on which a Ti-N-Fe film is formed by sputtering as an underlying layer for plating. A pre-set resist frame is formed and Ni-Fe is formed by plating. The resist frame is removed and a resist is formed to a pre-set shape and subsequently removed by wet etching for completing the upper magnetic pole 3. By the above process, the MR thin-film head is completed.

By suitably adjusting the amount of magnetization of the hard films 24, 25 from one MR thin film head product to another, at the time of magnetization, the magnetic permeability μ of the flux guide layer 17b may be adjusted from one MR thin film head to another, thus enabling fluctuations in the bias efficiency and signal magnetic field engagement effects to be eliminated from one product to another. The result is the significantly improved product yield and operational reliability.

The present invention is not limited to the above-described embodiments. Thus the material, shape or size of various components may be optionally selected without departing from the scope of the invention. For example, although the above description has been made of the vertical MR thin-film head, in which the MR element 1 is provided in a direction perpendicular to the direction of sliding of the magnetic recording medium and the forward end electrode 17a and the flux guide layer 17b are formed at the upper and lower portions in the longitudinal direction of the MR element 1, the present invention may also be applied to a transverse MR thin-film head in which the MR element 1 is arrayed in a direction parallel to the sliding direction of the magnetic recording medium and the electrodes are arrayed on either sides of the longitudinal direction of the MR element. In this case, the flux guide layer and the hard films are formed at back of the MR element. As the MR element, a so-called artificial giant magneto-resistive effect film, in which two-layer films of Ni-Fe/Cu or Ni-Fe-Co/Cu are formed as multiple layers.

What is claimed is:

1. A magneto-resistive effect a-fill magnetic head comprising:
    a magnetic layer exhibiting a magneto-resistive effect, said magnetic layer having a longitudinal axis and two ends positioned at opposite ends of the longitudinal axis; and
    a flux guide layer of a high magnetic permeability soft magnetic material formed at and overlapping one end of the magnetic layer, said flux guide layer having two opposite ends longitudinally aligned with the longitudinal axis of the magnetic layer; wherein the improvement comprises
    separate hard fills operating as permanent magnets formed on .and overlapping both ends of the flux guide layer.

2. The magneto-resistive effect thin-film magnetic head as claimed in claim 1 wherein the flux guide layer is formed of an Ni-Fe based alloy or a Co-Zr based amorphous alloy.

3. The magneto-resistive effect thin-film magnetic head as claimed in claim 1 wherein the hard films are formed of a material selected from the group consisting of Co-Pt based alloys, Co-Cr based alloys, Sm-Co based alloys, Nd-Fe based alloys and ferrite.

4. The magneto-resistive effect thin-film magnetic head as claimed in claim 1 wherein the flux guide layer is formed on an underlying layer.

5. The magneto-resistive effect thin-film magnetic head as claimed in claim 4 wherein the underlying layer is formed of Ta or Cr.

6. The magneto-resistive effect thin-film magnetic head as claimed in claim 1 wherein the magnetic layer exhibiting magneto-resistive effect is arranged in a direction perpendicular to a relative sliding direction between the magnetic head and a magnetic, recording medium, and wherein, in addition to the flux guide layer, there is formed over the magnetic layer, at the end opposite that at which the flux guide layer is formed, a forward end electrode.

7. The magneto-resistive effect thin-film magnetic head as claimed in claim 6 wherein the flux guide layer is used simultaneously as a rear end electrode.

8. The magneto-resistive effect thin-film magnetic head as claimed in claim 1 wherein the transverse width and the vertical width of each hard film are wider than the transverse width and the vertical width of the flux guide layer.

* * * * *